United States Patent
Suzuki et al.

(10) Patent No.: US 8,006,562 B2
(45) Date of Patent: *Aug. 30, 2011

(54) ATMOSPHERIC PRESSURE MEASURING APPARATUS AND METHOD OF MEASURING ATMOSPHERIC PRESSURE

(75) Inventors: Yoshitaka Suzuki, Kawasaki (JP);
Takahiro Imamura, Kawasaki (JP);
Shinji Koganezawa, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 12/364,193

(22) Filed: Feb. 2, 2009

(65) Prior Publication Data
US 2009/0288491 A1 Nov. 26, 2009

(30) Foreign Application Priority Data
May 22, 2008 (JP) ................... 2008-134632

(51) Int. Cl.
*G01L 11/00* (2006.01)
(52) U.S. Cl. .......................................................... 73/702
(58) Field of Classification Search .................. None
See application file for complete search history.

(56) References Cited

U.S. PATENT DOCUMENTS

| | | | | | |
|---|---|---|---|---|---|
| 4,483,345 | A | * | 11/1984 | Miwa | 600/438 |
| 4,735,088 | A | * | 4/1988 | Pinyan et al. | 73/629 |
| 6,185,801 | B1 | * | 2/2001 | Kadota et al. | 29/25.35 |
| 2009/0196129 | A1 | * | 8/2009 | Suzuki et al. | 369/19 |
| 2009/0266162 | A1 | * | 10/2009 | Ayazi et al. | 73/504.12 |

* cited by examiner

*Primary Examiner* — Andre Allen
(74) *Attorney, Agent, or Firm* — Greer, Burns & Crain, Ltd.

(57) ABSTRACT

A receiver receives an acoustic wave in an atmospheric pressure measuring apparatus. Since a variation in the intensity of an acoustic wave reflects a variation in the atmospheric pressure, the atmospheric pressure can be measured based on the intensity of the acoustic wave received at the receiver. The atmospheric pressure can in this manner easily be measured with a simplified structure.

22 Claims, 11 Drawing Sheets

ATMOSPHERIC PRESSURE MEASURING APPARATUS AND METHOD OF MEASURING ATMOSPHERIC PRESSURE

CROSS-REFERENCE TO RELATED APPLICATION

This application is based upon and claims the benefit of priority from the prior Japanese Patent Application No. 2008-134632 filed on May 22, 2008, the entire contents of which are incorporated herein by reference.

FIELD

The embodiments discussed herein are related to an atmospheric pressure measuring apparatus and a method of measuring an atmospheric pressure.

BACKGROUND

An atmospheric pressure sensor includes an air-tightly closed casing for measurement of an absolute pressure. A sensor unit is located in the casing. The sensor unit holds data of a reference pressure inside the casing. The volume of the casing changes in response to a variation in the atmospheric pressure. The sensor unit is designed to calculate the pressure inside the casing based on the change in the volume. The sensor unit utilizes a difference between the reference pressure and the detected pressure to measure the atmospheric pressure.

The pressure inside the air-tightly closed casing of the atmospheric pressure sensor is maintained at a constant level so as to ensure the accuracy of the measurement. A high pressure always acts on the sensor unit. The sensor unit sometimes suffers from a so-called creep. The creep is supposed to result in a deteriorated accuracy of the measurement. Moreover, the casing has to be air-tightly closed without any gap so as to maintain the pressure inside the casing at a constant level. A high processing technique is required to produce such a casing.

SUMMARY

According to an aspect of the present invention, there is provided an atmospheric pressure measuring apparatus comprising: a receiver receiving an acoustic wave; and a controlling section detecting the atmospheric pressure based on the intensity of at least one specific component of the acoustic wave received at the receiver.

The receiver receives an acoustic wave in the atmospheric pressure measuring apparatus. Since a variation in the intensity of an acoustic wave reflects a variation in the atmospheric pressure, the atmospheric pressure can be measured based on the intensity of the acoustic wave received at the receiver. The atmospheric pressure can in this manner easily be measured with a simplified structure.

The atmospheric pressure measuring apparatus is incorporated in a disk drive, for example. In this case, the disk drive may comprises: an enclosure defining an inner space; a sound source established in the inner space, the sound source radiating an acoustic wave; a receiver incorporated in the inner space, the receiver receiving the acoustic wave radiated from the sound source; and a controlling section detecting an atmospheric pressure based on the intensity of at least one specific component of the acoustic wave received at the receiver.

A method of measuring the atmospheric pressure may comprise: receiving an acoustic wave; and detecting the atmospheric pressure based on the intensity of at least one specific component of the acoustic wave received at the receiver.

The receiver receives an acoustic wave in the method. Since a variation in the intensity of an acoustic wave reflects a variation in the atmospheric pressure, the atmospheric pressure can be measured based on the intensity of the acoustic wave received by the receiver. In this manner, the atmospheric pressure can easily be measured with a simplified structure.

Measurement of an atmospheric pressure in accordance with the method may be carried out in a disk drive, for example. In this case, the method may comprise: receiving an acoustic wave radiated from a sound source established in an inner spaced defined in the enclosure of a disk drive by using a receiver placed in the inner space; and detecting the atmospheric pressure inside the inner space based on the intensity of at least one specific component of the acoustic wave received at the receiver.

The object and advantages of the embodiment will be realized and attained by means of the elements and combinations particularly pointed out in the appended claims. It is to be understood that both the foregoing general description and the following detailed description are exemplary and explanatory and are not restrictive of the embodiment, as claimed.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF EMBODIMENTS

Embodiments of the present invention will be explained below with reference to the accompanying drawings.

Figure 1:
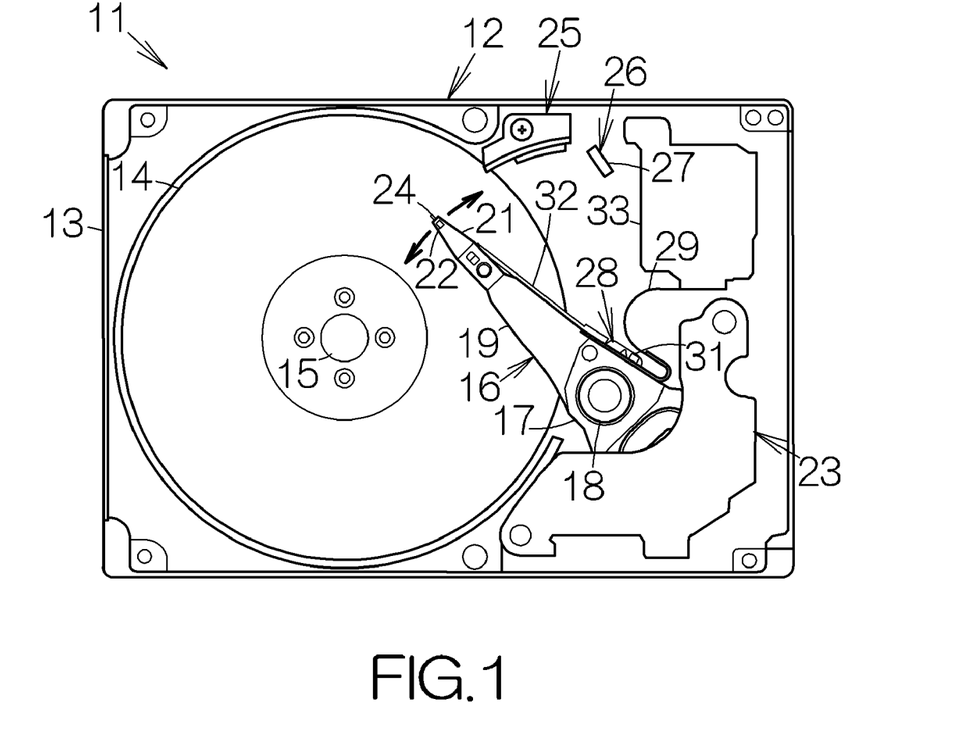
FIG. 1 is a plan view schematically illustrating the structure of a hard disk drive, HDD, as a specific example of a disk drive according to the present invention.

FIG. 1 schematically illustrates the structure of a hard disk drive, HDD, 11 as an example of a storage medium drive or a storage apparatus according to the present invention. The hard disk drive 11 includes an enclosure 12. The enclosure 12 includes a box-shaped base 13 and a cover, not depicted. The base 13 defines an inner space in the form of a flat parallelepiped, for example. The base 13 may be made of a metallic material such as aluminum. Molding process may be employed to form the base 13. The cover is coupled to the opening of the base 13. A sealed inner space is defined between the base 13 and the cover. Pressing process may be employed to form the cover out of a metal plate material, for example.

At least one magnetic recording disk 14 as a storage medium is enclosed in the enclosure 12. The magnetic recording disk or disks 14 are mounted on the driving shaft of a spindle motor 15. The spindle motor 15 drives the magnetic recording disk or disks 14 at a higher revolution speed such as 4,200 rpm, 5,400 rpm, 7,200 rpm, 10,000 rpm, 15,000 rpm, or the like.

As conventionally known, the spindle motor 15 includes an electromagnet, namely a coil, and a permanent magnet. The coil is fixed to a stator. The permanent magnet is fixed to a rotor at a position opposed to the coil. When electric current is supplied to the coil, a magnetic field is generated at the coil. The magnetic field and the permanent magnet allow the rotor to rotate around a rotation axis. The rotation of the spindle motor 15 causes generation of an electromagnetic noise, namely an acoustic wave, having a predetermined frequency. The frequency of the acoustic wave varies depending on the revolution speed of the rotation of the magnetic recording disk 14. Consequently, the spindle motor 15 can be a sound source in the hard disk drive 11.

The aforementioned base 13 is a molded article made of aluminum. The cover is made from a metal plate material, for example. The rotation of the spindle motor 15 makes the base 13 and the cover vibrate, for example. An acoustic wave is thus generated and radiated from the base 13 and the cover. Simultaneously, airflow is generated along the rotating magnetic recording disk 14. The airflow makes the base 13 and the cover vibrate, for example. An acoustic wave is generated. The acoustic wave has a specific frequency. Consequently, the base 13 and the cover, namely the enclosure 12, can be a sound source in the hard disk drive 11.

A carriage 16 is also enclosed in the enclosure 12. The carriage 16 includes a carriage block 17. The carriage block 17 is supported on a vertical pivot shaft 18 for relative rotation. Carriage arms 19 are defined in the carriage block 17. The carriage arms 19 extend in a horizontal direction from the vertical pivot shaft 18. The carriage block 17 may be made of aluminum, for example. Extrusion process may be employed to form the carriage block 17, for example.

A head suspension 21 is attached to the front or tip end of the individual carriage arm 19. The head suspension 21 extends forward from the carriage arm 19. A flexure is attached to the front or tip end of the head suspension 21. The flexure will be described later in detail. A so-called gimbal spring is defined in the flexure. A flying head slider 22 is supported on the gimbal spring. The gimbal spring allows the flying head slider 22 to change its attitude relative to the head suspension 21. A head element or electromagnetic transducer is mounted on the flying head slider 22 as described later in detail.

When the magnetic recording disk 14 rotates, the flying head slider 22 is allowed to receive airflow generated along the rotating magnetic recording disk 14. The airflow serves to generate a positive pressure or a lift as well as a negative pressure on the flying head slider 22. The lift is balanced with the urging force of the head suspension and the negative pressure so that the flying head slider 22 is allowed to keep flying above the surface of the magnetic recording disk 14 during the rotation of the magnetic recording disk 14 at a higher stability.

When the carriage 16 swings around the vertical pivot shaft 18 during the flight of the flying head slider 22, the flying head slider 22 is allowed to move on an arc defined in the radial direction of the magnetic recording disk 14. The electromagnetic transducer on the flying head slider 22 is thus allowed to cross the data zone defined between the innermost and outermost recording tracks. The electromagnetic transducer on the flying head slider 22 is positioned right above a target recording track on the magnetic recording disk 14.

A power source such as a voice coil motor, VCM, 23 is coupled to the carriage block 17. The voice coil motor 23 serves to drive the carriage block 17 around the vertical pivot shaft 18. The rotation of the carriage block 17 allows the carriage arms 19 and the head suspensions 21 to swing.

Here, a control signal is supplied to the voice coil motor 23. If the frequency of the control signal includes the natural frequency or frequencies of any of the carriage block 17, the carriage arms 19 and the head suspension 21 in the carriage 16, and the voice coil motor 23, the resonance occurs in the carriage 16 and/or the voice coil motor 23. Acoustic waves having their specific frequencies are radiated from the carriage 16 and the voice coil motor 23 based on the resonance. Consequently, the carriage 16 and the voice coil motor 23 can be sound sources in the hard disk drive 11.

A load tab 24 is attached to the tip end of the individual head suspension 21. The load tab 24 extends forward from the head suspension 21. The load tab 24 is allowed to move in the radial direction of the magnetic recording disk 14 based on the swinging movement of the carriage arm 19. A ramp member 25 is located at a position outside the magnetic recording disk 14 on the movement path of the load tab 24 so as to receive the load tabs 24. The ramp member 25 and the load tabs 24 in combination establish a so-called load/unload mechanism. The ramp member 25 is made of a hard plastic material, for example. The ramp member 25 is fixed to the bottom plate of the base 13 at a position outside the magnetic recording disk 14.

A receiving slit or groove, not depicted, is formed in the ramp member 25. The magnetic recording disk 14 is received in the receiving groove. The front end of the ramp member 25 extends above the magnetic recording disk 14. Airflow is generated along the surface of the rotating magnetic recording disk 14 as described above. The airflow collides against an obstacle, namely the ramp member 25. A noise, namely an acoustic wave, having a specific frequency is thus generated. The frequency of the acoustic wave varies depending on the revolution speed of the magnetic recording disk 14. Consequently, the magnetic recording disk 14 can be a sound source in the hard disk drive 11.

The hard disk drive 11 includes an atmospheric pressure measuring apparatus 26. The atmospheric pressure measuring apparatus 26 includes an atmospheric pressure sensor 27. The atmospheric pressure sensor 27 is located on the bottom plate of the base 13 at a position outside the movement range of the carriage arms 19 and the head suspensions 21. A screw, not depicted, may be utilized to fix the atmospheric pressure sensor 27 to the bottom plate of the base 13, for example. The front of the atmospheric pressure sensor 27 is opposed to one of the aforementioned sound sources. A detailed description will be made on the atmospheric pressure measuring apparatus 26 and the atmospheric pressure sensor 27 later.

As is apparent from FIG. 1, a flexible printed circuit board unit 28 is p laced on the carriage block 17. The flexible printed circuit board unit 28 includes a head IC (integrated circuit) 31 mounted on a flexible printed wiring board 29. The head IC 31 is connected to the read head element and the write head element of the electromagnetic transducer. A flexure 32 is utilized to connect the head IC 31 to the electromagnetic transducer. The flexure 32 has its long tail connected to the flexible printed circuit board unit 28. The flexure 32 includes a wiring pattern. The wiring pattern serves to connect the flying head slider 22 to the flexible printed wiring board 29.

The head IC 31 is designed to supply the read head element of the electromagnetic transducer with a sensing current when magnetic bit data is to be read. The read head element has the current-perpendicular-to-plane (CPP) structure, for example. The head IC 31 is also designed to supply the write head element of the electromagnetic transducer with a writing current when magnetic bit data is to be written. The write head element is a single-pole head element, for example. The current value of the sensing current is set at a specific value. A small-sized circuit board 33 is placed within the inner space of the enclosure 12. A printed circuit board, not depicted, is attached to the backside of the bottom plate of the base 13. The head IC 31 receives the sensing current and the writing current from the small-sized circuit board 33 or the printed circuit board on the bottom plate of the base 13.

Figure 2:
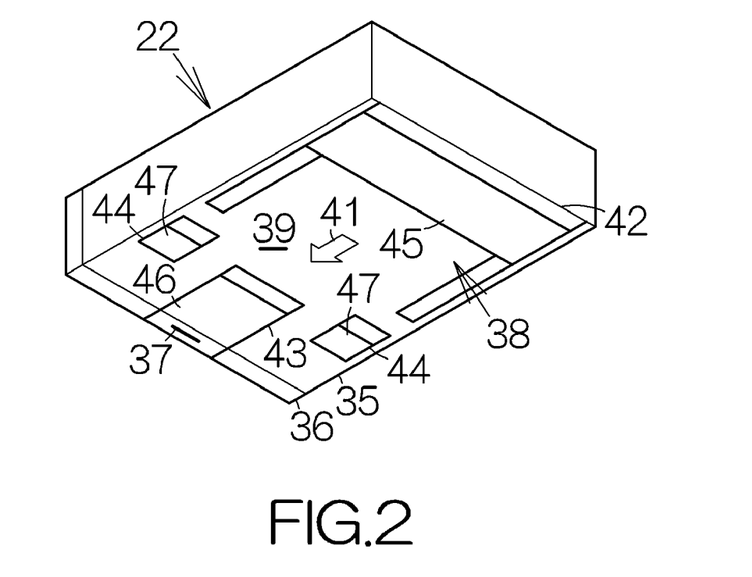
FIG. 2 is an enlarged perspective view schematically illustrating a head slider.

FIG. 2 illustrates a specific example of the flying head slider 22 according to an embodiment of the present invention. The flying head slider 22 includes a slider body 35 in the form of a flat parallelepiped, for example. An insulating nonmagnetic film, namely a head protection film 36, is overlaid on the outflow or trailing end surface of the slider body 35. An electromagnetic transducer 37 is embedded in the head protection film 36. The slider body 35 may be made of a hard material such as $Al_2O_3$—TiC. The head protection film 36 may be made of a relatively soft material such as $Al_2O_3$ (alumina).

The flying head slider 22 defines a medium-opposed surface, namely a bottom surface 38, opposed to the magnetic recording disk 14 at a distance. A flat base surface 39 as a reference surface is defined in the bottom surface 38. When the magnetic recording disk 14 rotates, airflow 41 flows along the bottom surface 38 from the inflow or front end toward the outflow or rear end of the slider body 35.

A front rail 42 is formed on the bottom surface 38 of the slider body 35. The front rail 42 stands upright from the base surface 39 of the bottom surface 38 near the inflow end of the slider body 35. The front rail 42 extends along the inflow end of the base surface 39 in the lateral direction of the slider body 35. A rear rail 43 is likewise formed on the bottom surface 38 of the slider body 35. The rear rail 43 stands upright from the base surface 39 of the bottom surface 38 near the outflow end of the slider body 35. The rear rail 43 is located at the intermediate position in the lateral direction of the slider body 35. The rear rail 43 extends on the head protection film 36.

A pair of side rear rails 44, 44 is likewise formed on the bottom surface 38 of the slider body 35. The side rear rails 44, 44 stand upright from the base surface 39 of the bottom surface 38 near the outflow end of the slider body 35. The side rear rails 44, 44 are located along the sides of the slider body 35, respectively. The side rear rails 44, 44 are thus distanced from each other in the lateral direction of the slider body 35. The rear rail 43 is located in a space between the side rear rails 44, 44.

So-called air bearing surfaces 45, 46, 47 are defined on the top surfaces of the front, rear and side rear rails 42, 43, 44, respectively. Steps connect the inflow ends of the air bearing surfaces 45, 46, 47 to the top surfaces of the rails 42, 43, 44, respectively. The bottom surface 38 of the flying head slider 22 is designed to receive the airflow 41 generated along the rotating magnetic recording disk 14. The steps serve to generate a larger positive pressure or lift at the air bearing surfaces 45, 46, 47, respectively. Moreover, a larger negative pressure is generated behind the front rail 42, namely at a position downstream of the front rail 42. The negative pressure is balanced with the lift so as to stably establish the flying attitude of the flying head slider 22. It should be noted that the flying head slider 22 can take any shape or form different from the described one.

Figure 3:
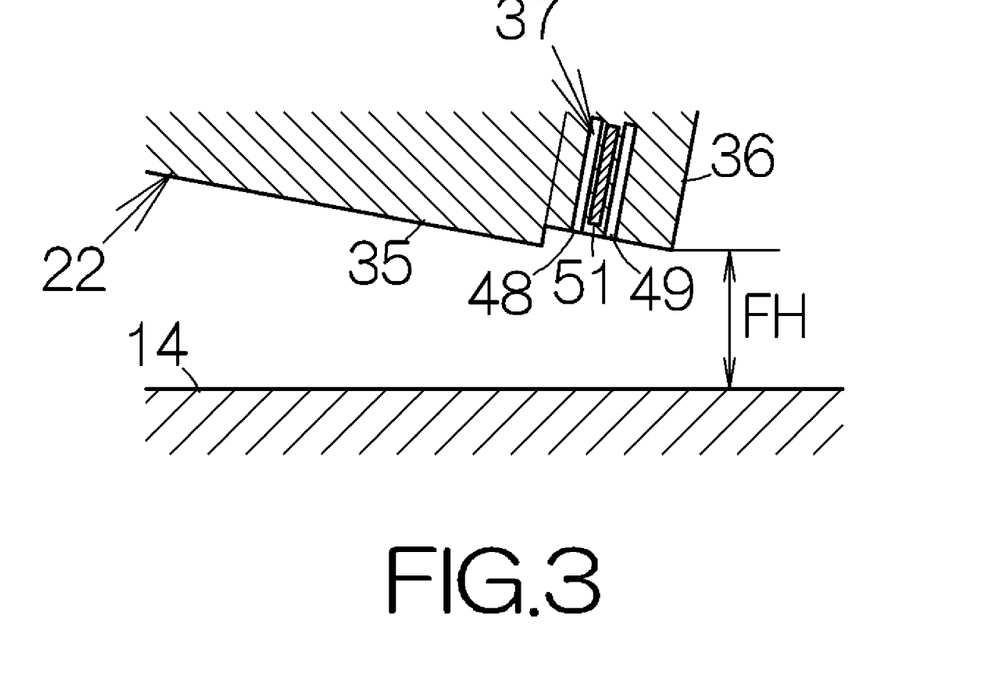
FIG. 3 is an enlarged partial sectional view schematically illustrating an electromagnetic transducer.
Figure 4:
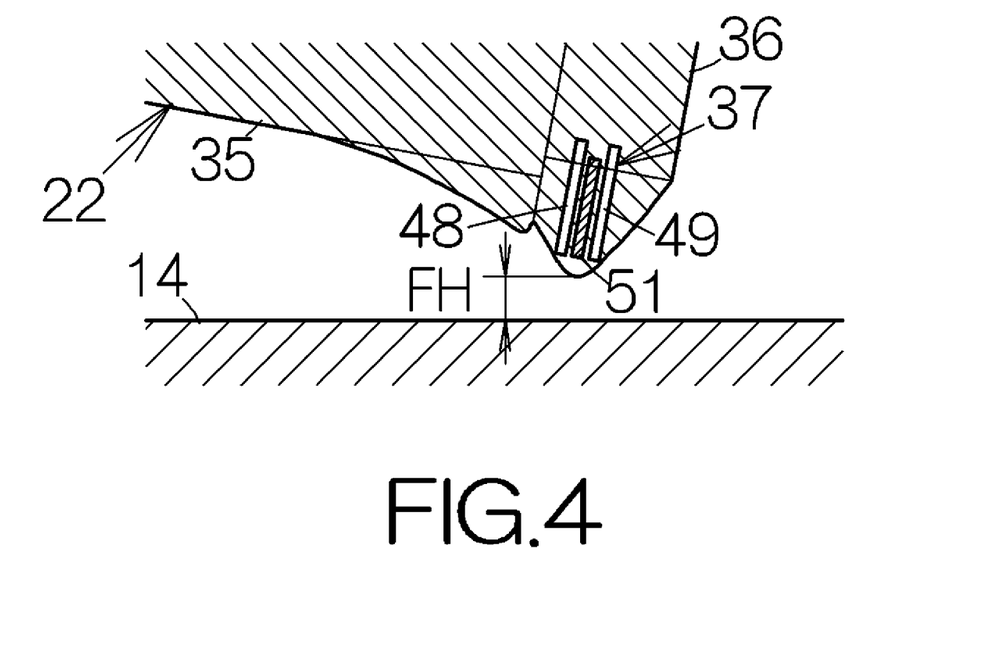
FIG. 4 is an enlarged partial sectional view schematically illustrating a protrusion formed in the head slider.

As depicted in FIG. 3, the electromagnetic transducer 37 includes a read head element 48 and a write head element 49. A heater 51 is incorporated at a position between the read head element 48 and the write head element 49. The heater 51 includes a heating wiring pattern, for example. When electric power is supplied to the heater 51, the heater 51 generates heat. The generated heat causes the thermal expansion not only of the heater 51 but also of the read head element 48, the write head element 49 and the head protection film 36. The head protection film 36 and the slider body 35 thus protrude on the top surface of the rear rail 43, as depicted in FIG. 4. This results in formation of a so-called protrusion. The read head element 48 and the write head element 49 thus get closer to the magnetic recording disk 14. The flying amount, namely the flying height FH, of the electromagnetic transducer 37 is in this manner determined.

Figure 5:
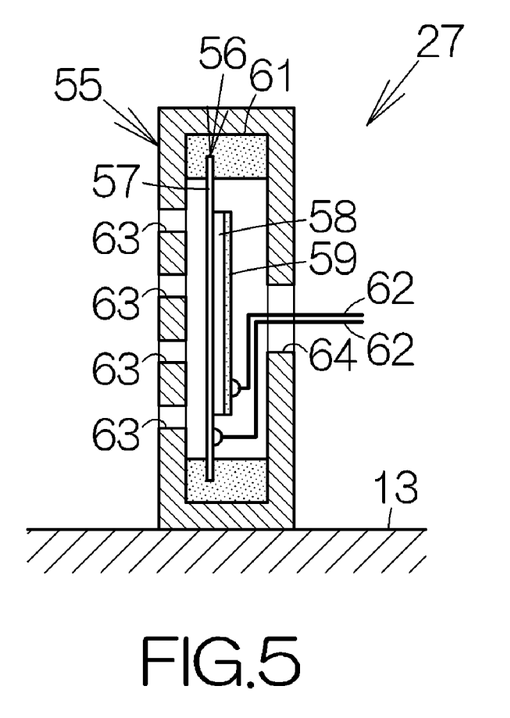
FIG. 5 is a sectional view schematically illustrating an atmospheric pressure sensor according to an embodiment of the present invention.

FIG. 5 schematically illustrates the structure of the atmospheric pressure sensor 27 according to an embodiment of the present invention. The atmospheric pressure sensor 27 includes a casing 55 defining an inner space in the form of a parallelepiped, for example. The casing 55 is made of a resin material, for example. A receiver, namely a microphone 56, is placed in the inner space of the casing 55. The microphone 56 includes a diaphragm 57 and a piezoelectric material 58. The front surface of the piezoelectric material 58 is superposed on and bonded to the back surface of the diaphragm 57. A metal plate such as a brass plate or a stainless steel plate is employed as the diaphragm 57. A piezoelectric ceramic thin film is employed as the piezoelectric material 58, for example. An electrode 59 is formed on the back surface of the piezoelectric material 58. The diaphragm 57 is supported on a vibration absorbing material 61. The diaphragm 57 may be supported on the vibration absorbing material 61 over its entire outer periphery. The vibration absorbing material 61 is fixed to the inward wall surface of the casing 55. Wirings 62, 62 are connected to the diaphragm 57 and the electrode 59, respectively.

Figure 6:
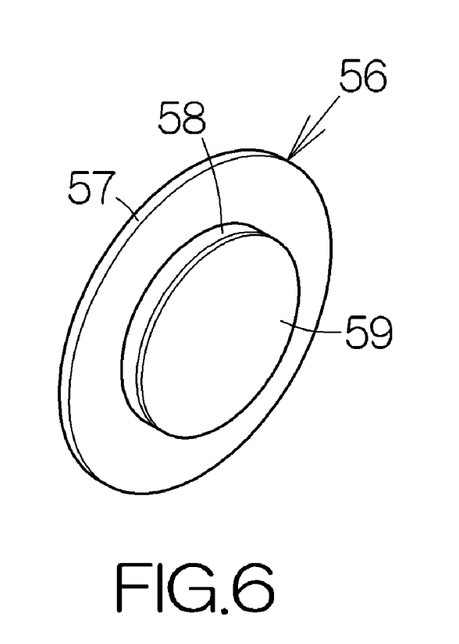
FIG. 6 is an enlarged perspective view schematically illustrating a receiver.

Ventilation openings 63 are defined in the front of the casing 55, for example. The inner space of the casing 55 is connected to the outer space of the casing 55, namely the inner space of the enclosure 12, through the ventilation openings 63. The ventilation openings 63 are opposed to the front surface of the diaphragm 57. The front of the casing 55 is opposed to one of the aforementioned sound sources. A wire opening 64 is formed in the back of the casing 55. The wirings 62 are taken out through the wire opening 64. Referring also to FIG. 6, the diaphragm 57, the piezoelectric material 58 and the electrode 59 are each formed in the shape of a disk. The vibration absorbing material 61 is formed in an annular shape. A so-called piezoelectric buzzer may be employed as the microphone 56.

When an acoustic wave is radiated from any of the sound sources in the hard disk drive 11, the acoustic wave propagates through air in the inner space of the hard disk drive 11. The acoustic wave passes through the ventilation openings 63 to reach the inner space of the casing 55. When the diaphragm 57 receives the acoustic wave, the diaphragm 57 vibrates. The vibration of the diaphragm 57 induces shrinkage and/or elongation of the piezoelectric material 58. The piezoelectric material 58 in this manner generates a predetermined electric signal, namely alternating voltage. The alternating voltage is taken out through the wirings 62. Since the diaphragm 57 is supported on the vibration absorbing material 61 as described above, the diaphragm 57 is prevented from receiving transmission of the vibration from the casing 55 to the utmost. The diaphragm 57 is thus allowed to receive the acoustic wave with a higher accuracy.

Figure 7:
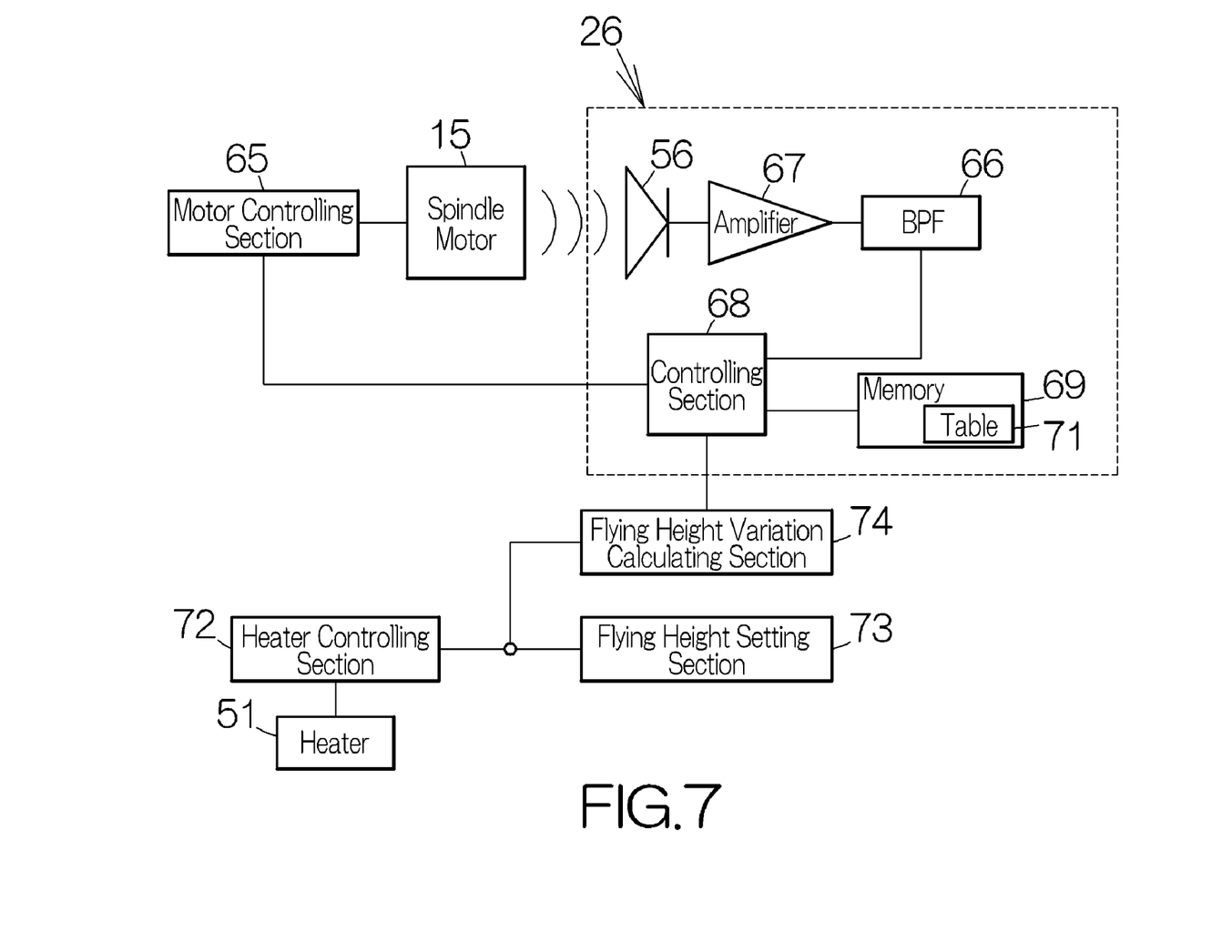
FIG. 7 is a block diagram presenting a control system according to an embodiment.

As depicted in FIG. 7, the spindle motor 15 is employed as a sound source in this embodiment. A motor controlling section 65 is connected to the spindle motor 15. The motor controlling section 65 is designed to supply a predetermined amount of electric power to the spindle motor 15. The spindle motor 15, having the magnetic recording disk 14, is driven to rotate in response to the supply of the electric power. The revolution speed of the spindle motor 15 is determined depending on the amount of the electric power. As long as the electric power is constantly supplied, the revolution speed of the spindle motor 15 is kept at a predetermined level. An acoustic wave having a specific frequency is radiated from the spindle motor 15 in accordance with the revolution speed of the spindle motor 15 as described above.

The front of the atmospheric pressure sensor 27 is opposed to the spindle motor 15. The microphone 56 is thus opposed to the spindle motor 15. The microphone 56 receives the acoustic wave radiated from the spindle motor 15. A band-pass filter 66 is connected to the microphone 56. The band-pass filter 66 serves to eliminate noise included in the alternating voltage output from the microphone 56. Only the output corresponding to the acoustic wave radiated from the spindle motor 15 is allowed to pass through the band-pass filter 66. An amplifier 67 is interposed between the microphone 56 and the band-pass filter 66. The amplifier 67 serves to amplify the output of the alternating voltage.

A reduction in the atmospheric pressure in the inner space of the enclosure 12, namely of the inner space of the casing 55, results in a reduction in the air density of the inner space of the casing 55. This causes a reduction in the intensity of the transmitted acoustic wave. On the other hand, an increase in the atmospheric pressure in the inner space of the casing 55 results in an increase in the air density of the inner space of the casing 55. This causes a gain in the intensity of the transmitted acoustic wave. The intensity of the acoustic wave can thus be utilized to measure the atmospheric pressure inside the enclosure 12 as described later in detail.

A controlling section 68 is connected to the band-pass filter 66. The controlling section 68 receives the alternating voltage from the band-pass filter 66. The controlling section 68 is also connected to the aforementioned motor controlling section 65. The controlling section 68 is designed to notify the motor controlling section 65 of the revolution speed of the spindle motor 15. A memory 69 is connected to the controlling section 68. A non-volatile memory is employed as the memory 69. A predetermined table 71 is stored in the memory 69. The table 71 is utilized to specify the relationship between the intensity of the acoustic wave received at the microphone 56 and the atmospheric pressure. The table 71 is established for each revolution speed of the spindle motor 15.

Figure 8:
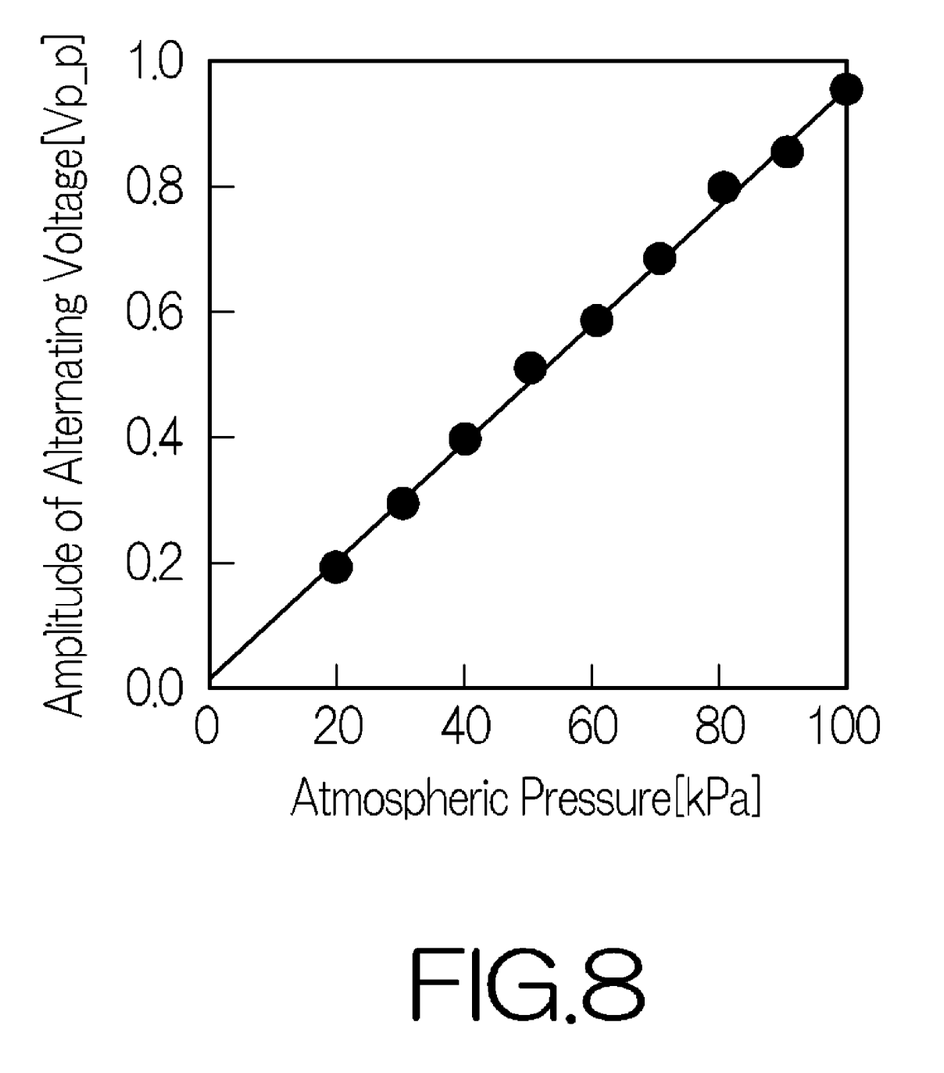
FIG. 8 is a graph presenting the relationship between the output from the receiver and an atmospheric pressure.

FIG. 8 is a graph representing the table 71 according to a specific embodiment. The y-axis of the graph denotes the amplitude [$V_{p-p}$] of the alternating voltage taken out from the microphone 56. An actual measurement is conducted to reveal the relationship between the amplitude of the alternating voltage and the atmospheric pressure as depicted in the graph. The measurement may be carried out at the time of shipment of the hard disk drive 11 from a factory, for example. It should be noted that the measurement may not be limited within a range of the atmospheric pressure smaller than 100 [kPa]. The controlling section 68 refers to the table 71 so as to measure the level of the atmospheric pressure based on the alternating voltage output from the microphone 56 and the revolution speed output from the motor controlling section 65.

A heater controlling section 72 is connected to the heater 51 of the flying head slider 22. The heater controlling section 72 is designed to supply a predetermined amount of electric power to the heater 51. The heater 51 generates heat in response to the supply of electric power. The temperature of the heater 51 depends upon the amount of the electric power. Specifically, the amount of the protrusion is controlled by adjusting the amount of the electric power. The flying height FH of the electromagnetic transducer 37 is in this manner controlled. A flying height setting section 73 is connected to the heater controlling section 72. The flying height setting section 73 is designed to notify the heater controlling section 72 of the amount of the electric power. The heater controlling section 72 supplies the notified amount of electric power to the heater 51 in accordance with the instructions from the flying height setting section 73. It should be noted that a so-called zero calibration may be executed to specify the amount of electric power.

A flying height variation calculating section 74 is connected to the aforementioned controlling section 68. The controlling section 68 is designed to notify the flying height variation calculating section 74 of the specified atmospheric pressure. The flying height variation calculating section 74 is designed to calculate a variation in the flying height FH of the electromagnetic transducer 37 based on the notified atmospheric pressure. The flying height variation calculating section 74 may refer to the relationship between the atmospheric pressure and a variation in the flying height FH. The relationship may be figured out beforehand based on an actual measurement, a computer simulation, or the like. The relationship may be stored in a memory, not depicted, in the hard disk drive 11. The calculated variation of the flying height FH is notified to the heater controlling section 72. The heater controlling section 72 adjusts the amount of the electric power supplied from the flying height setting section 73 in accordance with the calculated variation.

When the atmospheric pressure drops, for example, the air density decreases. The flying head slider 22 thus suffers from a reduction in the positive pressure acting on the flying head slider 22. This results in a reduction in the flying height FH of the electromagnetic transducer 37. The heater controlling section 72 correspondingly reduces the amount of the electric power supplied to the heater 51. The protrusion amount is thus reduced. When the atmospheric pressure increases, the air density increases. The flying head slider 22 thus suffers from an increase in the positive pressure acting on the flying head slider 22. This results in an increase in the flying height FH of the electromagnetic transducer 37. The heater controlling section 72 correspondingly increases the amount of the electric power supplied to the heater 51. The protrusion amount thus increases. In this manner, the flying height FH of the electromagnetic transducer 37 is kept constant irrespective of a variation in the atmospheric pressure.

The hard disk drive 11 enables determination of the amount of the protrusion prior to the reading/writing operation of the magnetic bit data. The atmospheric pressure inside the enclosure 12 is measured to determine the protrusion amount. The atmospheric pressure measuring apparatus 26 measures the atmospheric pressure as described above. The result of the measurement is supplied to the flying height variation calculating section 74. The flying height variation calculating section 74 calculates a variation in the flying height FH of the electromagnetic transducer 37 based on the atmospheric pressure. The heater controlling section 72 adjusts the amount of the electric power supplied to the heater 51 in accordance with the calculated variation. The protrusion amount is in this manner determined for the reading/writing operation of the magnetic bit data. When the protrusion amount is determined, the electromagnetic transducer 37 is allowed to fly above the surface of the magnetic recording disk 14 at a predetermined flying height FH. The protrusion amount is adjusted every time when the hard disk drive 11 is booted up, for example.

An acoustic wave having a specific frequency is constantly radiated from the spindle motor 15. The frequency of the acoustic wave is determined depending on the revolution speed of the spindle motor 15. The acoustic wave is directed to the microphone 56. The acoustic wave propagates through the air. The diaphragm 57 vibrates in response to reception of the acoustic wave. The vibration of the diaphragm 57 induces the shrinkage and/or elongation of the piezoelectric material 58. A predetermined alternating voltage is generated in the piezoelectric material 58 in accordance with the vibration of the diaphragm 57. The alternating voltage is output from the microphone 56 through the wirings 62. The alternating voltage of a predetermined frequency passes through the bandpass filter 66. The filtered alternating voltage is then supplied to the controlling section 68. The controlling section 68 calculates the atmospheric pressure in accordance with the relationship specified in the table 71 in the aforementioned manner.

The atmospheric pressure measuring apparatus 26 is incorporated in the hard disk drive 11. An acoustic wave is transmitted to the microphone 56 in the atmospheric pressure measuring apparatus 26. Since a variation in the intensity of an acoustic wave reflects a variation in the atmospheric pressure, the atmospheric pressure can be measured based on the intensity of the acoustic wave received at the microphone 56. In this manner, the atmospheric pressure can easily be measured with a simplified structure. Moreover, a variation in the flying height FH of the electromagnetic transducer 37 is calculated based on the atmospheric pressure. The amount of the protrusion of the flying head slider 22 is controlled in accordance with the detected variation in the flying height FH. The flying height FH of the electromagnetic transducer 37 can thus be kept constant irrespective of a variation in the atmospheric pressure. Magnetic bit data can be read/written with a high accuracy.

Figure 9:
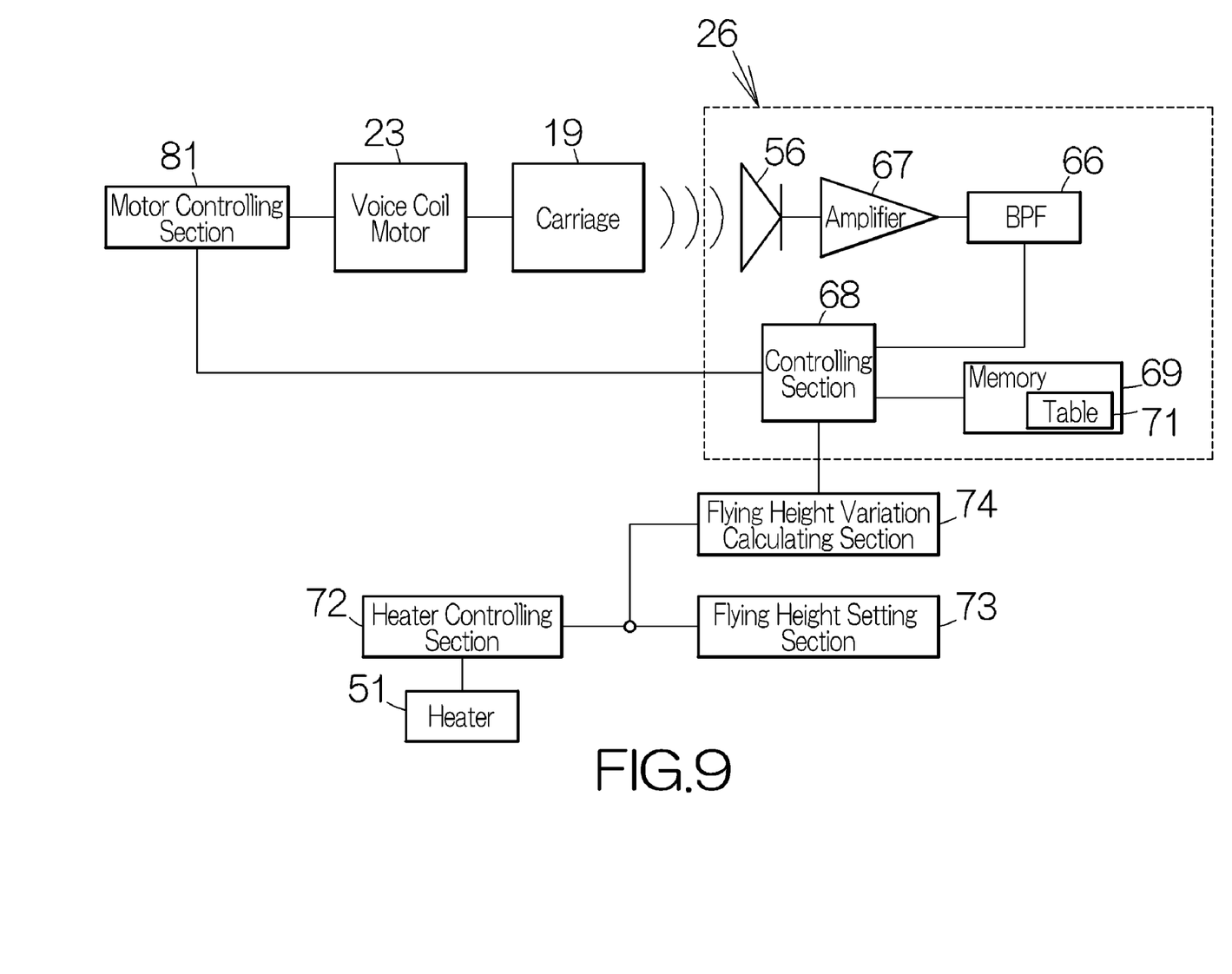
FIG. 9 is a block diagram illustrating a control system according to another embodiment.

As depicted in FIG. 9, the hard disk drive 11 may employ the carriage 16 as a sound source in place of the spindle motor 15. A motor controlling section 81 is connected to the voice coil motor 23. The motor controlling section 81 is designed to supply a predetermined amount of electric power to the voice coil motor 23. The voice coil motor 23 drives the carriage 16, namely the carriage arms 19, to swing in response to the supply of the electric power. The rotation angle of the carriage arms 19 is determined depending on the amount of the electric power. The front of the microphone 56 is opposed to the carriage 16. The table 71 is utilized to specify the relationship between the intensity of the acoustic wave from the carriage 16 and the atmospheric pressure. Like reference numerals are attached to the structure or components equivalent to the aforementioned ones.

An acoustic wave having a specific frequency is radiated from the carriage 16 based on the resonance in the hard disk drive 11 in the same manner as described above. The acoustic wave is transmitted to the microphone 56. Since a variation in the intensity of the acoustic wave reflects a variation in the atmospheric pressure, the atmospheric pressure can be measured based on the intensity of the acoustic wave received at the microphone 56. In this manner, the atmospheric pressure can easily be measured with a simplified structure. Moreover, the flying height FH of the electromagnetic transducer 37 can be kept constant irrespective of a variation in the atmospheric pressure in the same manner as described above. Magnetic bit data can be read/written with a high accuracy. The voice coil motor 23 may be employed as a sound source in place of the carriage 16. The vibration of a yoke occurs in the voice coil motor 23, for example.

Figure 10:
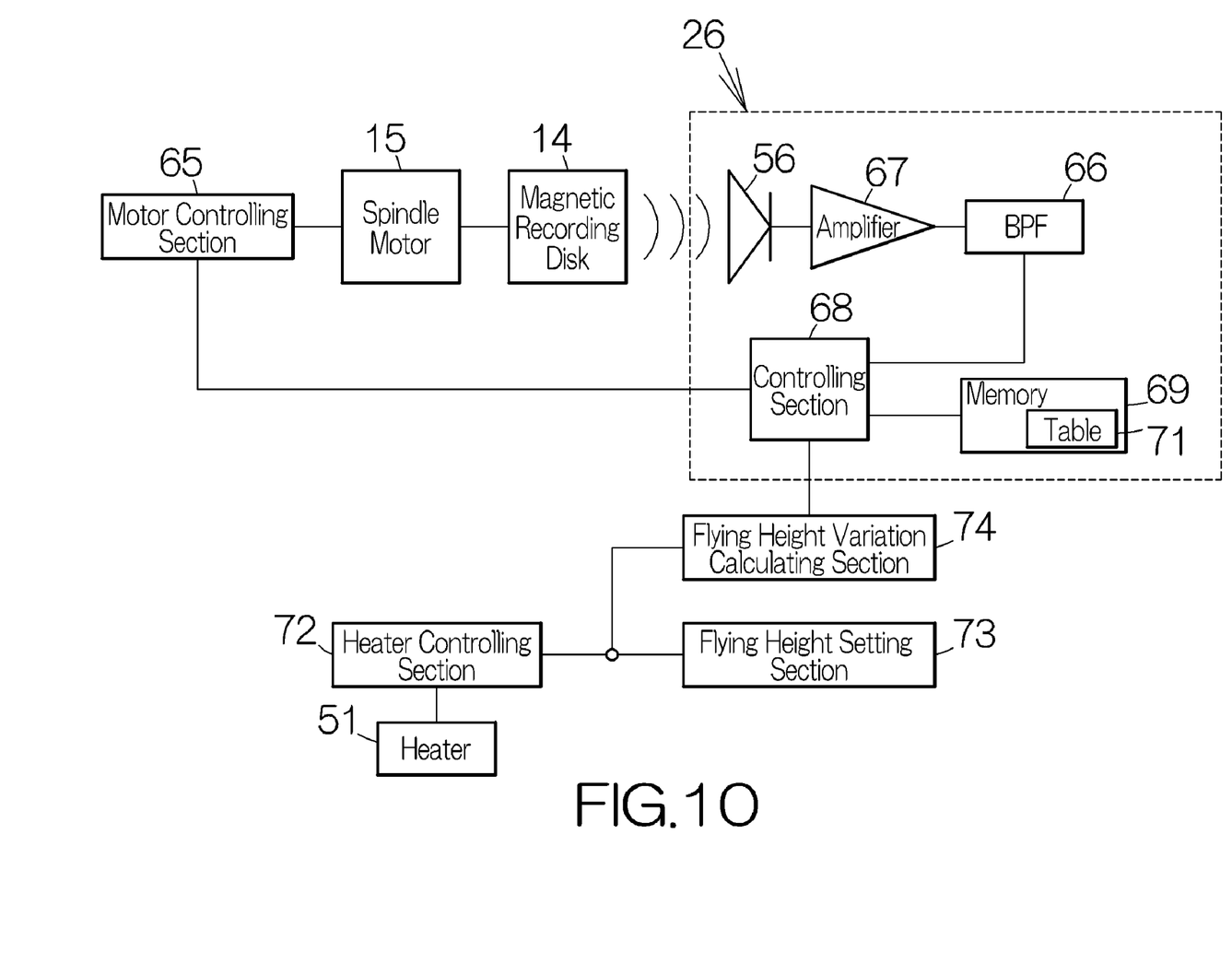
FIG. 10 is a block diagram illustrating a control system according to another embodiment.

As depicted in FIG. 10, the hard disk drive 11 may employ the magnetic recording disk or disks 14 as a sound source in place of the spindle motor 15, the carriage 16 or the voice coil motor 23. The motor controlling section 65 is designed to supply a predetermined amount of electric power to the spindle motor 15 in the same manner as described above. The spindle motor 15, namely the magnetic recording disk or disks 14, is driven to rotate in response to the supply of electric power. The front of the microphone 56 is opposed to the receiving groove of the ramp member 25. The table 71 is utilized to specify the relationship between the intensity of the acoustic wave from the magnetic recording disk or disks 14 and the atmospheric pressure. Like reference numerals are attached to the structure or components equivalent to the aforementioned ones.

The magnetic recording disk or disks 14 generates a noise, namely an acoustic wave, during its rotation in the hard disk drive 11 as described above. The acoustic wave is transmitted to the microphone 56. Since a variation in the intensity of the acoustic wave reflects a variation in the atmospheric pressure, the atmospheric pressure can be measured based on the intensity of the acoustic wave received at the microphone 56. In this manner, the atmospheric pressure can easily be measured with a simplified structure. Moreover, the flying height FH of the electromagnetic transducer 37 can be kept constant irrespective of a variation in the atmospheric pressure in the same manner as described above. Magnetic bit data can be read/written with high accuracy.

Figure 11:
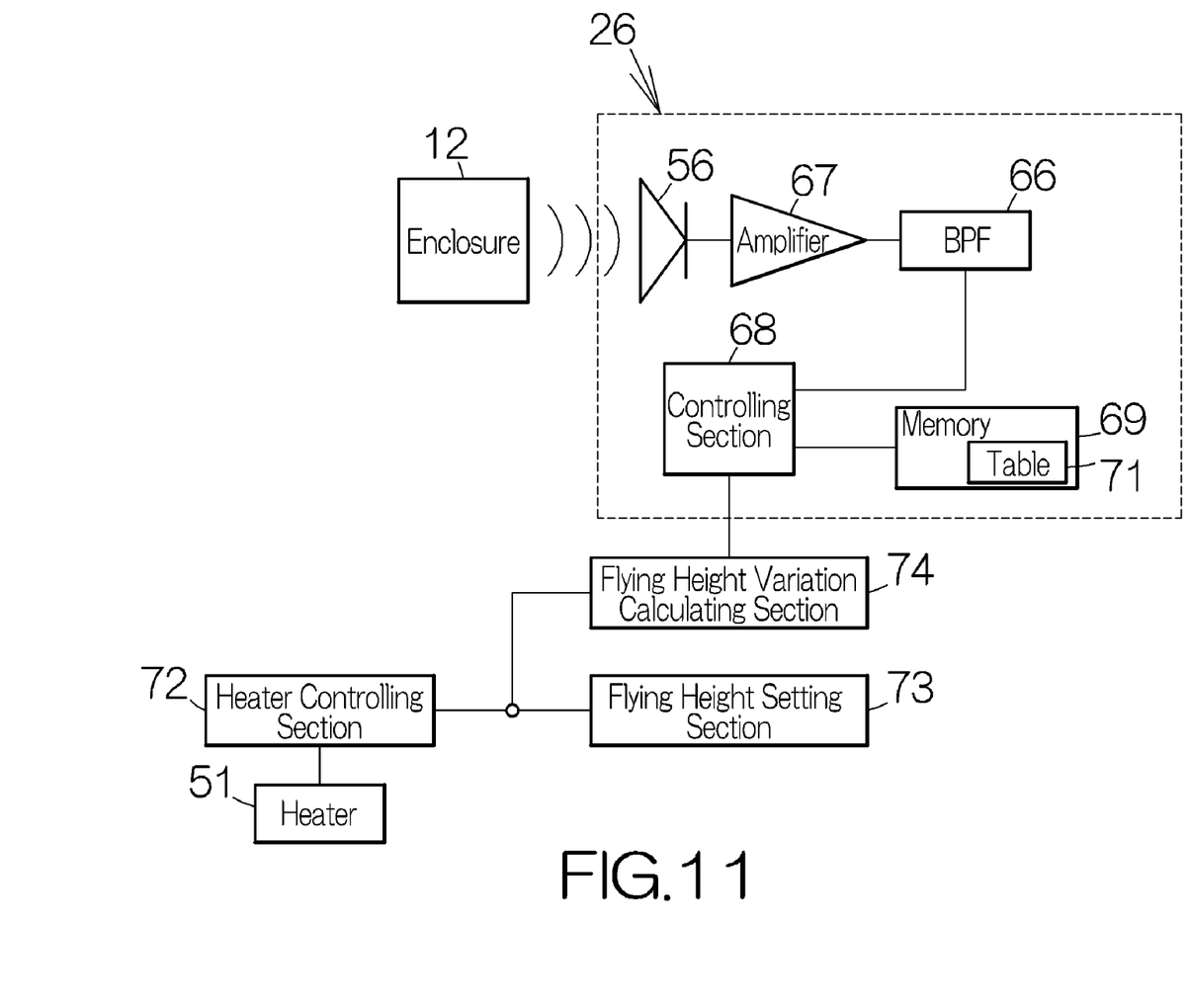
FIG. 11 is a block diagram illustrating a control system according to another embodiment.

As depicted in FIG. 11, the hard disk drive 11 may employ the enclosure 12, namely the base 13 and the cover, as a sound source in place of the spindle motor 15, the carriage 16, the voice coil motor 23 or the magnetic recording disk or disks 14. The spindle motor 15, namely the magnetic recording disk or disks 14, is driven to rotate in response to the supply of electric power in the same manner as described above. The front of the microphone 56 is opposed to the base 13 and the cover. The table 71 is utilized to specify the relationship between the atmospheric pressure and the intensity of the acoustic wave from the base 13 and the cover. Like reference numerals are attached to the structure or components equivalent to the aforementioned ones.

The rotation of the spindle motor 15 and the magnetic recording disk or disks 14 causes the vibration of the base 13 and the cover. An acoustic wave is generated based on the vibration of the base 13 and the cover. The acoustic wave is transmitted to the microphone 56. Since a variation in the intensity of the acoustic wave reflects a variation in the atmospheric pressure, the atmospheric pressure can be measured based on the intensity of the acoustic wave received at the microphone 56. In this manner, the atmospheric pressure can easily be measured with a simplified structure. Moreover, the flying height FH of the electromagnetic transducer 37 can thus be kept constant irrespective of a variation in the atmospheric pressure in the same manner as described above. Magnetic bit data can be read/written with high accuracy.

Figure 12:
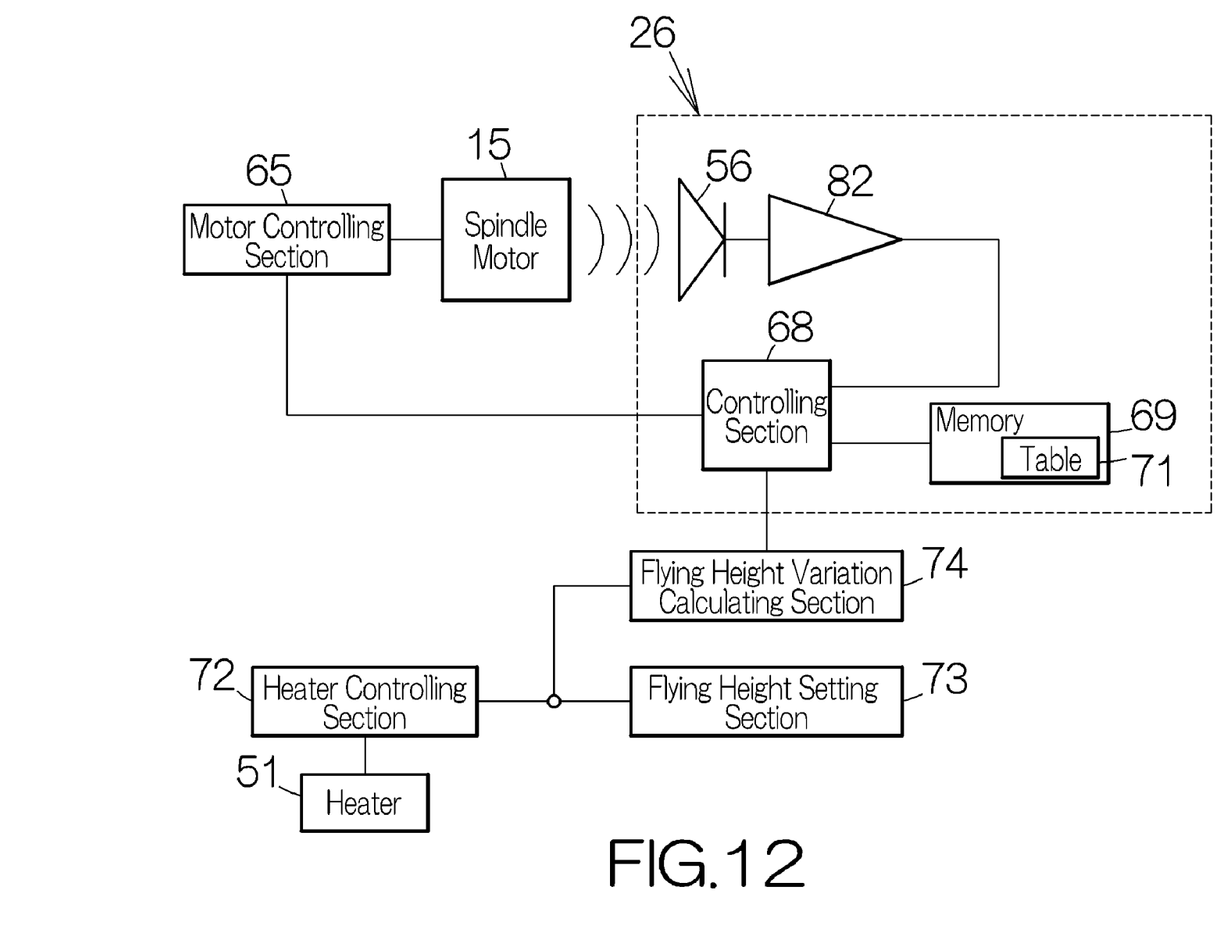
FIG. 12 is a block diagram illustrating a control system according to another embodiment.

As depicted in FIG. 12, a lock-in amplifier 82 may be incorporated in the aforementioned atmospheric pressure measuring apparatus 26 in place of the amplifier 67 and the band-pass filter 66. The lock-in amplifier 82 serves to extract a predetermined frequency component out of the alternating voltage output from the microphone 56. In this case, a synchronization signal may be supplied to the lock-in amplifier 82 from the motor controlling section 65. When the lock-in amplifier 82 in this manner extracts the predetermined frequency component based on the synchronization signal, the other acoustic waves having the other frequencies in the enclosure 12 is prevented from affecting the measurement of the atmospheric pressure. The intensity of a target acoustic wave is detected with accuracy. The atmospheric pressure is thus detected with a higher accuracy.

Figure 13:
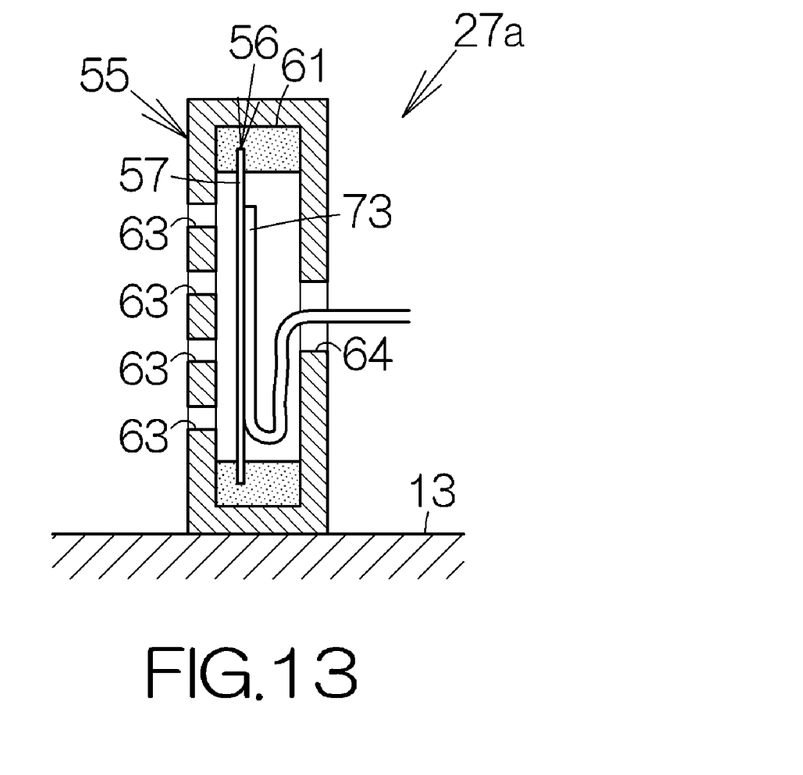
FIG. 13 is a sectional view schematically illustrating an atmospheric pressure sensor according to another embodiment.

FIG. 13 schematically illustrates an atmospheric pressure sensor 27a according to another embodiment of the present invention. A so-called piezoelectric film 83 is superposed on and bonded to the diaphragm 57 in the atmospheric pressure sensor 27a in place of the aforementioned piezoelectric material 58 and the electrode 59. The piezoelectric film 83 is formed in the shape of a disk in the same manner as the aforementioned piezoelectric material 58. Alternating voltage is taken out from the piezoelectric film 83 through a wiring, not depicted, for example. Like reference numerals are attached to the structure or components equivalent to those of the aforementioned atmospheric pressure sensor 27.

Figure 14:
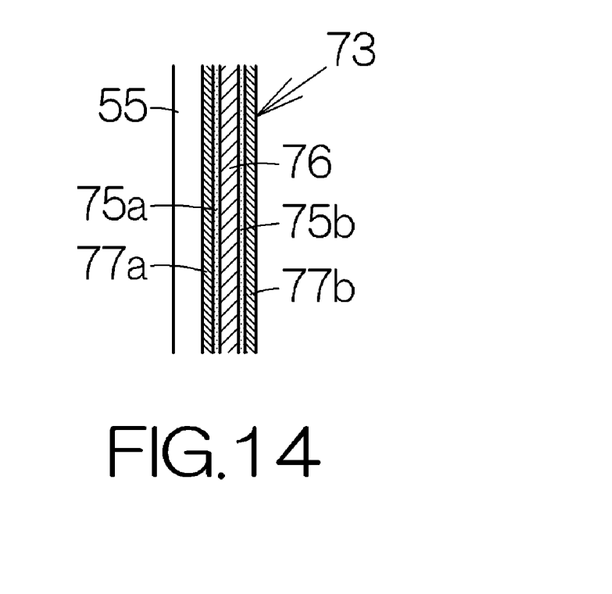
FIG. 14 is an enlarged partial sectional view schematically illustrating a piezoelectric film.

As depicted in FIG. 14, the piezoelectric film 83 includes a piezoelectric material 86 interposed between electrodes 85a, 85b. The piezoelectric material 86 is made of polyvinylidene fluoride resin (PVDF), for example. Insulating films 87a, 87b are bonded to the surfaces of the electrodes 85a, 85b, respectively. The insulating film 87a of the piezoelectric film 83 is bonded to the back surface of the diaphragm 57, for example. The vibration of the diaphragm 57 occurs in response to reception of the acoustic wave. Alternating voltage is generated in the electrodes 85a, 85b. The generated alternating voltage is output through the wiring. The atmospheric pressure sensor 27a is allowed to enjoy the advantages identical to those obtained in the aforementioned atmospheric pressure sensor 27.

Figure 15:
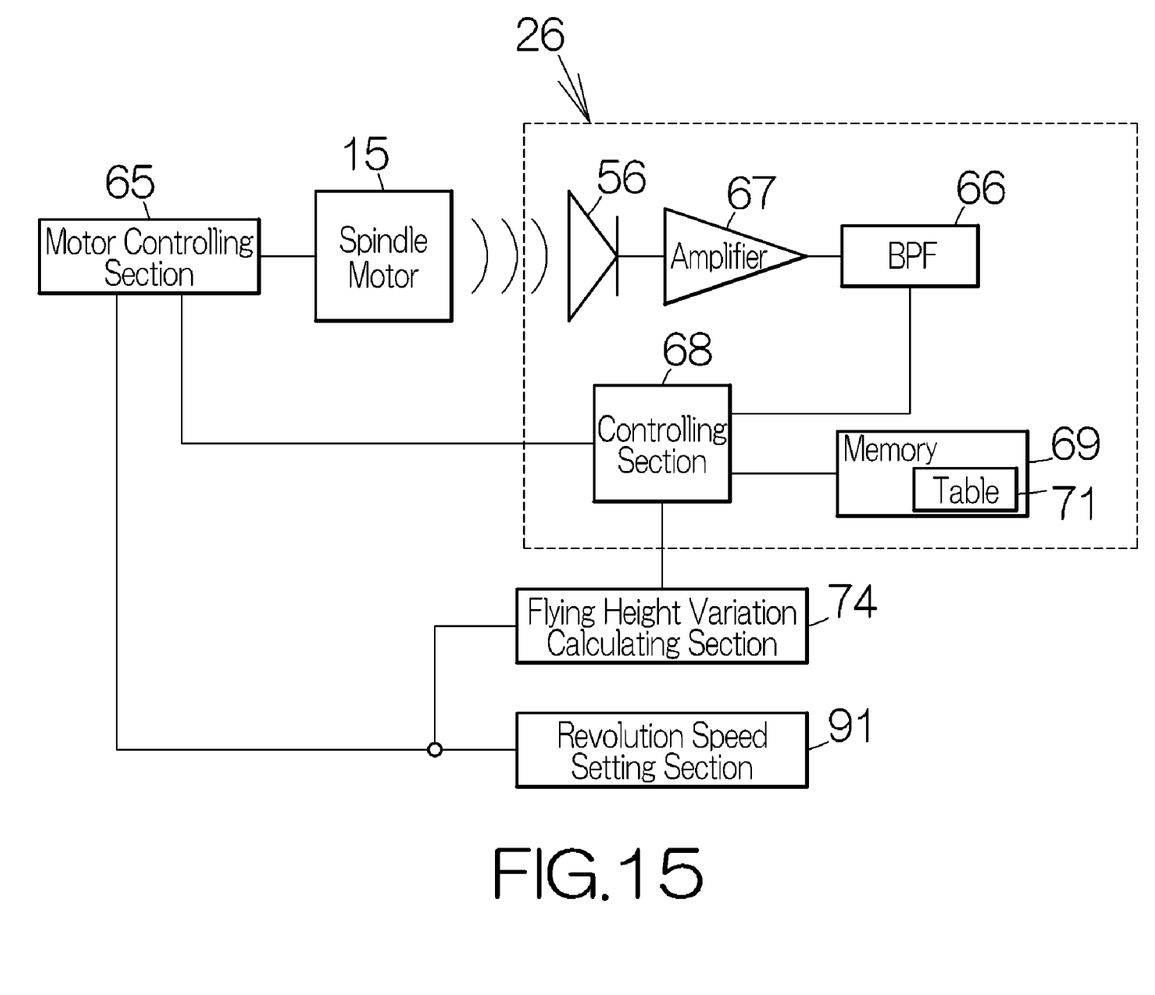
FIG. 15 is a block diagram illustrating a control system according to another embodiment.

As depicted in FIG. 15, in the hard disk drive 11, the motor controlling section 65 may be connected to the flying height variation calculating section 74 so as to adjust the flying height FH of the electromagnetic transducer 37. The heater 51 and the heater controlling section 72 are omitted. The variation of the flying height FH, calculated in the flying height variation calculating section 74, is notified to the motor controlling section 65. A revolution speed setting section 91 is connected to the motor controlling section 65. The revolution speed setting section 91 notifies the motor controlling section 65 of the amount of electric power. Like reference numerals are attached to the structure or components equivalent to the aforementioned ones.

When the atmospheric pressure drops, the electromagnetic transducer 37 is forced to suffer from a reduction in the flying height FH. In this case, the motor controlling section 65 operates to increase the electric power in accordance with the variation in the flying height FH. The revolution speed of the magnetic recording disk 14 thus increases. This results in an increase in the flow rate of the airflow generated along the front and back surfaces of the magnetic recording disk 14. The flying head slider 22 is thus allowed to enjoy an increase in the positive pressure acting on the flying head slider 22. The flying height FH of the electromagnetic transducer 37 is in this manner kept constant. When the atmospheric pressure increases, the electromagnetic transducer 37 is forced to suffer from an increase in the flying height FH. In this case, the motor controlling section 65 operates to decrease the electric power in accordance with the variation in the flying height FH. The revolution speed of the magnetic recording disk 14 thus decreases. This results in a reduction in the flow rate of the airflow generated along the front and back surfaces of the magnetic recording disk 14. The flying head slider 22 is thus allowed to enjoy a decrease in the positive pressure acting on the flying head slider 22. The flying height FH of the electromagnetic transducer 37 is in this manner kept constant.

The controlling section 68 may detect an abnormality in the hard disk drive 11 based on the intensity of an acoustic wave. After the aforementioned measurement of the atmospheric pressure has been completed, the controlling section 68 operates to monitor the amount and the frequency of the acoustic wave received at the microphone 56. The abnormality includes a crash of the flying head slider 22 against the surface of the magnetic recording disk 14, for example. Such a crash makes an acoustic wave. When the intensity of an acoustic wave received at the controlling section 68 is out of a predetermined range of the intensity expected during the normal operation of the hard disk drive 11, the controlling section 68 determines an abnormality in the hard disk drive 11. The controlling section 68 determines the cause of the abnormality based on the frequency of the acoustic wave. The relationship between the frequency and the cause of an abnormality may be stored in the memory 69. A log related to the cause of the abnormality is stored in the memory 69 in accordance with instructions from the controlling section 68. To repair the hard disk drive 11, a repairer refers to such a log so as to specify the cause of the abnormality.

All examples and conditional language recited herein are intended for pedagogical purposes to aid the reader in understanding the invention and the concept contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. An atmospheric pressure measuring apparatus comprising:
   a receiver receiving an acoustic wave; and
   a controlling section detecting an atmospheric pressure based on intensity of at least one specific component of the acoustic wave received at the receiver.
2. The atmospheric pressure measuring apparatus according to claim 1, wherein the controlling section utilizes a relationship between the atmospheric pressure and intensity of the acoustic wave received at the receiver for detection of the atmospheric pressure.
3. The atmospheric pressure measuring apparatus according to claim 1, wherein the receiver includes a diaphragm and a piezoelectric material bonded to the diaphragm.
4. A method of measuring an atmospheric pressure, comprising:
   receiving an acoustic wave; and
   detecting the atmospheric pressure based on intensity of at least one specific component of the acoustic wave received at the receiver.

5. The method according to claim 4, further comprising utilizing a relationship between the atmospheric pressure and the intensity of the acoustic wave received at the receiver for detection of the atmospheric pressure.

6. A disk drive comprising:
an enclosure defining an inner space;
a sound source established in the inner space, the sound source radiating an acoustic wave;
a receiver placed in the inner space, the receiver receiving the acoustic wave radiated from the sound source; and
a controlling section detecting an atmospheric pressure based on intensity of at least one specific component of the acoustic wave received at the receiver.

7. The disk drive according to claim 6, wherein the controlling section utilizes a relationship between the atmospheric pressure and intensity of the acoustic wave received at the receiver for detection of the atmospheric pressure.

8. The disk drive according to claim 6, wherein the sound source is a spindle motor placed in the inner space, the spindle motor driving at least one disk medium around a predetermined rotation axis.

9. The disk drive according to claim 6, wherein the sound source is at least one of a carriage and a voice coil motor placed in the inner space, the carriage being driven to swing around a predetermined pivot shaft, the voice coil motor driving the carriage to swing around the predetermined pivot shaft.

10. The disk drive according to claim 6, wherein the sound source is at least one of at least one disk medium and an obstacle placed in the inner space, the disk medium being driven to rotate around a predetermined rotation axis, the obstacle disturbing airflow generated based on the rotation of the disk medium.

11. The disk drive according to claim 6, wherein the sound source is the enclosure.

12. The disk drive according to claim 6, further comprising a head slider including a head element opposed to a surface of at least one disk medium so as to keep the head element flying above the disk medium at a predetermined flying height, wherein the flying height is determined depending on the atmospheric pressure.

13. The disk drive according to claim 6, wherein the controlling section detects an abnormality in the disk drive when the acoustic wave is detected from the sound source at an intensity out of a predetermined range.

14. The disk drive according to claim 6, wherein the receiver includes a diaphragm and a piezoelectric material bonded to the diaphragm.

15. A method of measuring an atmospheric pressure inside a disk drive, comprising:
receiving an acoustic wave radiated from a sound source established in an inner spaced defined in an enclosure of a disk drive by using a receiver placed in the inner space; and
detecting an atmospheric pressure inside the inner space based on intensity of at least one specific component of the acoustic wave received at the receiver.

16. The method according to claim 15, wherein the controlling section utilizes a relationship between the atmospheric pressure and intensity of the acoustic wave received at the receiver for detection of the atmospheric pressure.

17. The method according to claim 15, wherein the sound source is a spindle motor placed in the inner space, the spindle motor driving at least one disk medium around a predetermined rotation axis.

18. The method according to claim 15, wherein the sound source is at least one of a carriage and a voice coil motor placed in the inner space, the carriage being driven to swing around a predetermined pivot shaft, the voice coil motor driving the carriage to swing around the predetermined pivot shaft.

19. The method according to claim 15, wherein the sound source is at least one of at least one disk medium and an obstacle placed in the inner space, the disk medium being driven to rotate around a predetermined rotation axis, the obstacle disturbing airflow generated based on the rotation of the disk medium.

20. The method according to claim 15, wherein the sound source is the enclosure.

21. The method according to claim 15, further comprising determining a flying height of a head element above a surface of at least one disk medium depending on the atmospheric pressure.

22. The method according to claim 15, further comprising detecting an abnormality in the disk drive when the acoustic wave is detected from the sound source at an intensity out of a predetermined range.

* * * * *